July 25, 1944.  M. H. ARMS  2,354,296
GRINDING MACHINE
Filed Nov. 16, 1943
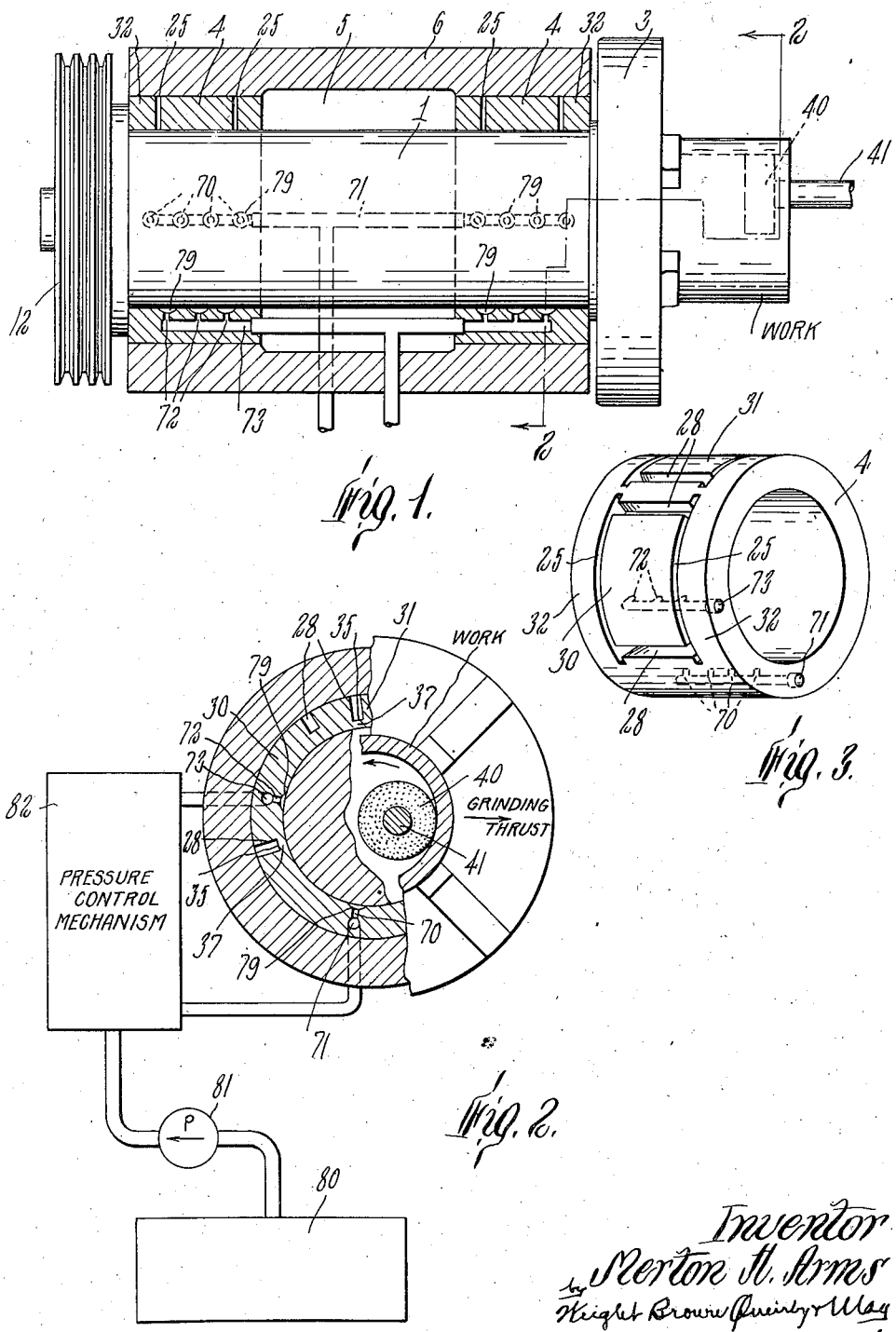

Patented July 25, 1944

2,354,296

UNITED STATES PATENT OFFICE 2,354,296

GRINDING MACHINE

Merton H. Arms, Springfield, Vt., assignor to Bryant Chucking Grinder Company, Springfield, Vt., a corporation of Vermont Application November 16, 1943, Serial No. 510,451

3 Claims. (Cl. 51—237)

Where the spindle of a grinding machine is mounted in bearings, and more particularly in plain bearings, a slight movement of the spindle laterally of its axis without metal to metal contact between the spindle and its bearing is possible. Should there be excessive clearance between the spindle and its bearings, other factors such as unbalance, variable belt pull, etc. will cause displacement of the spindle and result in inaccurate sizing. Pressure between the grinding wheel and the work may produce such lateral motion to an extent depending upon the amount of such pressure, so that if the work is ground to size under heavy pressure, reduction of such pressure thereafter may result in a reverse motion of the spindle, permitting further work cutting at the lower pressure and a corresponding amount of over-grinding.

An object of the present invention is to so apply lubricant to the spindle bearings as to prevent or minimize variable displacement of the spindle so as to prevent or minimize such over-grinding.

For a more complete understanding of this invention, reference may be had to the accompanying drawing in which Figure 1 is a view partly in plan and partly in central longitudinal section of a work spindle and its mounting and showing the relation between the work and the grinding wheel for grinding internal work.

Figure 2 is a detail cross sectional view on line 2—2 of Figure 1 and including also a diagram of the lubricant supply and control system.

Figure 3 is a perspective view of one of the bearing bushings.

This application is a continuation in part of my application Serial No. 276,179, filed May 27, 1939, for Bearing lubrication, which, in turn, is a division of my application Serial No. 217,886 for Spindle and bearing therefor, filed July 7, 1938, now Patent No. 2,245,378, granted June 10, 1941.

Referring to the drawing, at 1 is shown a spindle or shaft provided at one end with a nose to which a work holder of any desired type such as the chuck 3 may be secured. This spindle is carried by a pair of spaced bearing bushings 4 which are mounted within an opening 5 in a suitable support 6. In order to rotate the spindle, the opposite end from the chuck may carry a belt pulley 12. As shown the pulley is of the multiple V type, though a pulley of any other desired form may be used.

Each of the bearing bushings is shown as of the plain type and is preferably formed as disclosed in my Patent No. 2,245,378 hereinbefore mentioned, in which each bushing presents a circumferentially complete continuous inner face for bearing engagement on the spindle 1. The construction shown also provides means for taking up wear between the spindle and bushings. For the latter purpose, each bushing is provided with two pairs of longitudinally spaced slots 25 which extend entirely through the wall of the bushing for a portion of its circumference. These slots are connected longitudinally of the bushing by grooves 28 cut inwardly from the outer face of the bushing but terminating outwardly of the interior bore thereof. The grooves 28 and the slots 25 define a pair of portions 30 and 31 cut away from the end portions 32 of the bushing by the slots 25 and partly severed from each other and from the uncut portion of the bushing by the grooves 28 which define between their bases 35 and the inner face of the bushing integral connecting portions 37. These connecting portions are sufficiently flexible to permit the portions 30 and 31 to be deflected inwardly toward the axis of the bushing to take up wear and without any interruption of the continuous circumferential inner surfaces of the bushing within the lengths partly defined by the slots 25, except where oil holes extend therethrough, as will later appear. The portions 30 and 31 may be deflected inwardly to take up wear by any suitable means not material to this invention, as, for example, as shown in my Patent No. 2,245,-378, to which reference has previously been made.

Means are provided for introducing lubricant between the inner face of each bushing and the spindle or shaft. When starting the rotation of this spindle or shaft, it may be desired to introduce lubricant under a higher than normal pressure beneath it so as to force it away from the lower faces of the bushings, thus to make starting of rotation easier, and after the rotation has been started, this pressure may be reduced in order to permit the spindle to settle back into its normally rotating position with a film of oil maintained beneath it and floating its weight.

For the purpose of lubrication, a plurality of oil holes, preferably in two series, may be employed for each bushing. One of these series of oil holes, such as 70, opens on the inner face of each bushing beneath and slightly to one side of the spindle and communicates with a passage 71 extending through one end of the bushing. The holes of the other series shown at 72, which are staggered with respect to the holes 70, extend to the interior of the bushing at one side of the spindle and communicate with the passage 73. The holes 70 and 72 open into shallow chambers 79, making small angles with the bearing surface of the bushing to lead the oil in between the spindle and the bushing, this action being enhanced by rotation of the spindle. The staggering of the two sets of oil holes affords a more even distribution of the oil.

As shown in Figure 2 the rotation of the spindle is counterclockwise and the openings 72 are on the left side of the spindle. The grinding wheel 40 carried by the grinding wheel spindle 41 bears against the right hand inner face of the work piece and presses the work piece toward the right. Likewise oil under pressure from the openings 72 also presses the spindle and consequently the work piece toward the right. Thus should the pressure exerted by the wheel on the work be relaxed, the work stays pressed by the lubricant to the right and does not tend to follow back to the left, which, if allowed to occur when the work has been ground to correct finished size, would produce over-cutting of the work piece by the grinding wheel. As further described in my Patent No. 2,245,378 to which reference has been made, oil may be supplied from the supply tank 80 by a pump 81 to both sets of oil holes, means of various types being used to control the pressure of the oil entering through both sets and at the lower set of holes at either of two different pressures. Such pressure control means has been indicated diagrammatically at 82, this mechanism per se forming no part of the present invention.

From the foregoing description of an embodiment of this invention, it should be evident to those skilled in the art that various changes and modifications might be made without departing from the spirit or scope of this invention.

I claim:

1. In combination, means for supporting a work piece, means for rotarily supporting a grinding wheel for acting on a work piece so supported, at least one of said means comprising a rotary spindle and a bearing for rotarily supporting said spindle, and means for introducing lubricant into said bearing in a direction to force the spindle in the same direction as the thrust between said wheel and work piece.

2. In combination, a rotary suindle for supporting work, a rotary grinding wheel for cutting work supported by said spindle, a bearing in which said spindle is rotatably supported and presenting a circumferentially continuous bearing surface to said spindle, and means for forcing lubricant between said spindle and bearing in position to push said spindle in said bearing in the same direction as the force of the grinding wheel cut.

3. In combination, a rotary spindle for supporting work, a rotary grinding wheel for cutting work supported by said spindle and imparting a thrust to the work transverse to the axis of said spindle, a bearing in which said spindle is rotatably supported and presenting a circumferentially continuous bearing surface to said spindle, and means for forcing lubricant between said spindle and bearing in position to push said spindle in said bearing in the same direction transverse to said axis as the force of the grinding wheel cut.

MERTON H. ARMS.